(12) United States Patent
Stockhorst et al.

(10) Patent No.: US 6,502,876 B1
(45) Date of Patent: Jan. 7, 2003

(54) APPARATUS FOR THE REMOVAL OF CONTACT LENSES

(75) Inventors: Holger Stockhorst, Grossostheim (DE); Günter Lässig, Obernburg (DE); Peter Hagmann, Erlenbach am Main (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/811,023

(22) Filed: Mar. 16, 2001

(30) Foreign Application Priority Data

Mar. 16, 2000 (EP) .............................. 00105545

(51) Int. Cl.⁷ ................................ B25J 15/06
(52) U.S. Cl. ....................... 294/64.1; 294/1.2
(58) Field of Search ................ 294/1.2, 64.1; 206/5.1; 606/107; 901/40

(56) References Cited

U.S. PATENT DOCUMENTS

| 4,026,591 A | * | 5/1977 | Cleaveland | 294/1.2 |
| 5,069,494 A | * | 12/1991 | Reinson et al. | 206/5.1 |
| 5,561,970 A | | 10/1996 | Edie et al. | 53/473 |
| 5,687,541 A | * | 11/1997 | Martin et al. | 53/251 |
| 5,969,793 A | * | 10/1999 | Dobner | 351/247 |

FOREIGN PATENT DOCUMENTS

WO    WO 98/57788    12/1998

* cited by examiner

Primary Examiner—Dean J. Kramer
(74) Attorney, Agent, or Firm—R. Scott Meece; Jian Zhou; Richard I. Gearhart

(57) ABSTRACT

The invention is based on the problem of increasing the distance between the gripper and the mould half whilst maintaining the gripping power, so as to avoid damage to the contact lenses and the mould half, and of enabling the gripper to be simply aligned in relation to the mould half. This is solved by the usage of a spacer which is placed between the mould half and-the gripper. The distance between the mould half and the gripper is thereby increased without reducing the gripping, strength. In this way, damage to the mould half or the contact lens is avoided, and alignment of the gripper to the mould half is simplified. Moreover, the invention enables flaws in the periphery of the contact lens to be noticed more easily, since owing to the greater flux acting on the contact lens, the latter undergoes greater expansion in the end region of the gripper, thereby enabling possible flaws to be discerned more easily.

8 Claims, 6 Drawing Sheets

APPARATUS FOR THE REMOVAL OF CONTACT LENSES

The invention relates to an apparatus for removing contact lenses, especially from a mould half.

In an automatic manufacturing process for contact lenses, particularly disposable lenses that are manufactured in large unit numbers, it is necessary to automatically remove the contact lenses from a mould half. Contact lenses, which are to be manufactured economically in large unit numbers, are preferably manufactured by the so-called mould or full-mould process. In these processes, the lenses are manufactured into their final shape between two mould halves, so that there is no need to subsequently finish the surfaces of the lenses, nor to finish the edges. Mould processes are described for example in PCT patent application no. WO/87/04390 or in EP-A 0 367.513.

The contact lenses produced in this manner are moulded parts having little mechanical stability and a water content of more than 60% by weight. After manufacture, the lens is metrologically checked, then packaged and subjected to heat sterilisation at 121° C. in an autoclave.

In these known mould processes, the geometry of the contact lens to be manufactured is defined by the mould cavity. The edge of the contact lens is likewise formed by the mould which normally consists of two mould halves. The geometry of the edge is defined by the contour of the two mould halves in the area in which they make contact.

To manufacture a contact lens, first of all a certain amount of the fluid starting material is placed in the female mould half. Afterwards, the mould is closed by placing the male mould half thereon. Normally, a surplus of starting material is used, so that, when the mould is closed, the excess is expelled into an overflow area adjacent to the outer mould cavity. The subsequent, polymerisation or crosslinking of the starting material takes place by radiation with UV light, or by heat action, or by another non-thermal method.

Subsequently, the contact lenses thus produced must be removed from the mould halves, preferably from the female mould halves. To do this, a gripper is provided for example. This is moved in the direction of the mould half and removes the lenses from the mould half by applying suction to the lenses with a vacuum. After removing the lenses, the gripper arm moves into another position, so that further procedures can be carried out, such as drying of the contact lenses on the gripper, checking of the contact lens using an image-processing system, placing the contact lenses in a package, and rinsing and drying of the gripper itself. To this end, the gripper may be, for example, star-shaped, and in this configuration represents the connecting link between manufacturing the contact lenses and primary packaging. Only the lenses that are centred by the gripper and grasped smoothly can be checked by the image-processing system and subsequently deposited in the package. Thus, the accurate removal of lenses by the gripper is an essential prerequisite to attaining a high yield of the apparatus.

Usually prior to removal from the mould half, the contact lenses are first of all loosened and, if desired, also inverted from the male to the female mould half, since the actual removal of the contact lenses is preferably effected from the female mould half. To enable the apparatus to be operated most economically, several mould halves, preferably a figure of 10, can be held in one tool and grasped together by one gripper arm, which accordingly has 10 grippers.

To remove the contact lens from such a tool, the gripper arm moves downwards. The contact lens is suctioned onto the gripper by a vacuum. To remove the contact lens, a vacuum of ca. −0.3 bars (measured on the gripper) is required. The distance d between a gripper and a mould half, which is measured between the contour edge of a mould half and the end face of the gripper, should be preferably more than 0.5 mm, since otherwise damage may occur on the gripper or on the mould half. In order to ensure an exact adjustment of the gripper over the females mould halves in question, the gripper is aligned by moving towards the stop of the contour edge of the mould half, then elevated by a specific amount and subsequently fixed. However, this is extremely complex and relatively prone to errors.

The invention is based on the problem of increasing the distance between the gripper and the mould half whilst maintaining the gripping power, so as to avoid damage to the contact lenses and the mould half, and of enabling the gripper to be simply aligned in relation to the mould half. In addition, servicing of the apparatus should be simplified.

The invention solves this problem with the features indicated in claim 1. As far as further essential refinements are concerned, reference is made to the dependent claims.

By inserting a spacer which is placed between the mould half and the gripper, it is no longer necessary to exactly align the gripper in relation to the mould half, thereby enabling simpler servicing and assembly of the gripper to take place. In addition, there is improved centring of the contact lenses on the gripper, thus increasing accuracy of image processing.

Further details and advantages of the invention may be seen from the description that follows and the drawing. In the drawing, FIG. 1 shows a sectional view of a gripper;

Figure 1:
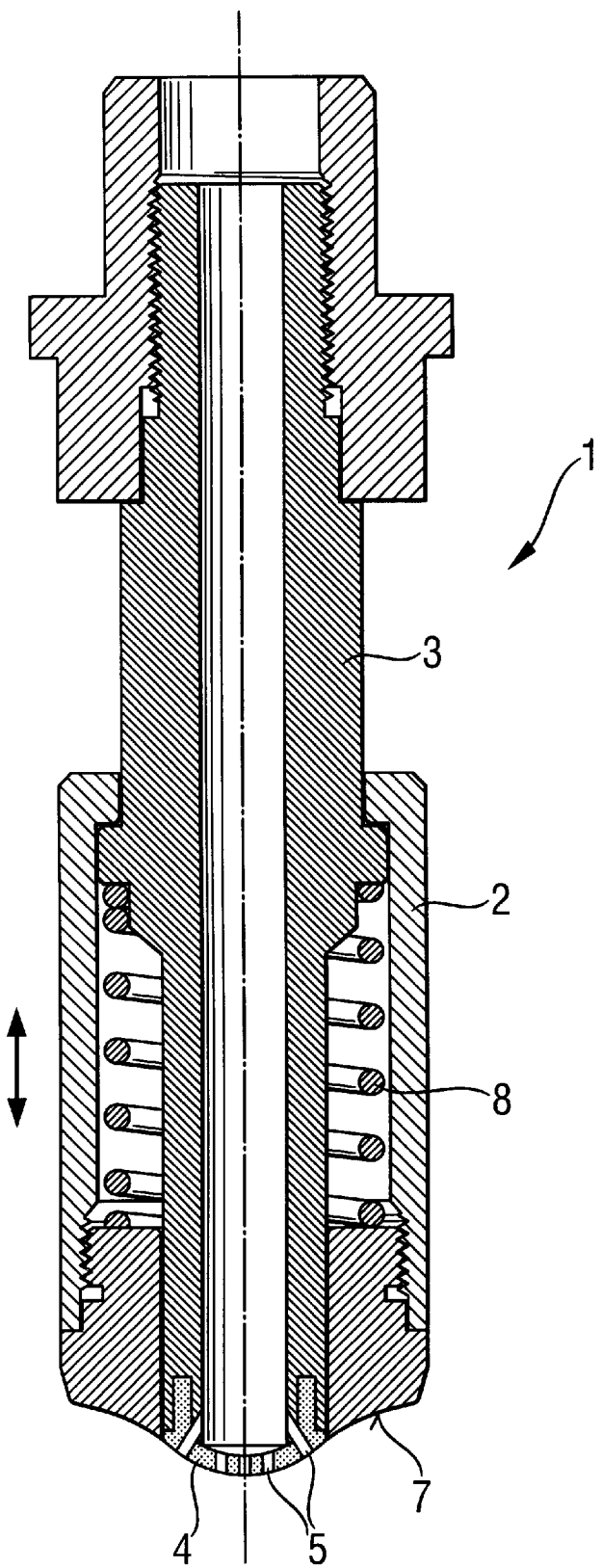

A gripper 1 illustrated in FIG. 1 consists of an outer gripping sleeve 2 and an inner section 3 of the gripper. It is preferably designed so. that the inner section 3 is held rigidly and the outer gripping sleeve 2 is movable. However, the reverse may also be the case, in which the inner section 3 is of movable design and the sleeve 2 is held rigidly. Furthermore, it is also possible for the gripping sleeve 2 and the inner section 3 to be formed in one piece, whereby there is no movement of the sleeve 2.and inner section 3. relatively to each other. The inner section 3 has a convex end 4, which is equipped with bores 5 that are preferably ring-shaped in order to suck up the contact lens 6. The curved end face 7 of the sleeve 2 is connected to this end region 4 of the inner section 3 of the gripper, the curve of this end face 7 being preferably concave. In a two-part design of the gripper 1, a compression spring 8 may be provided to support the inner section 3 or the gripping sleeve 2. The inner section 3 of the gripper is connected to a vacuum system which is not illustrated in detail here, and can be pressurised with a vacuum.

Figure 2:
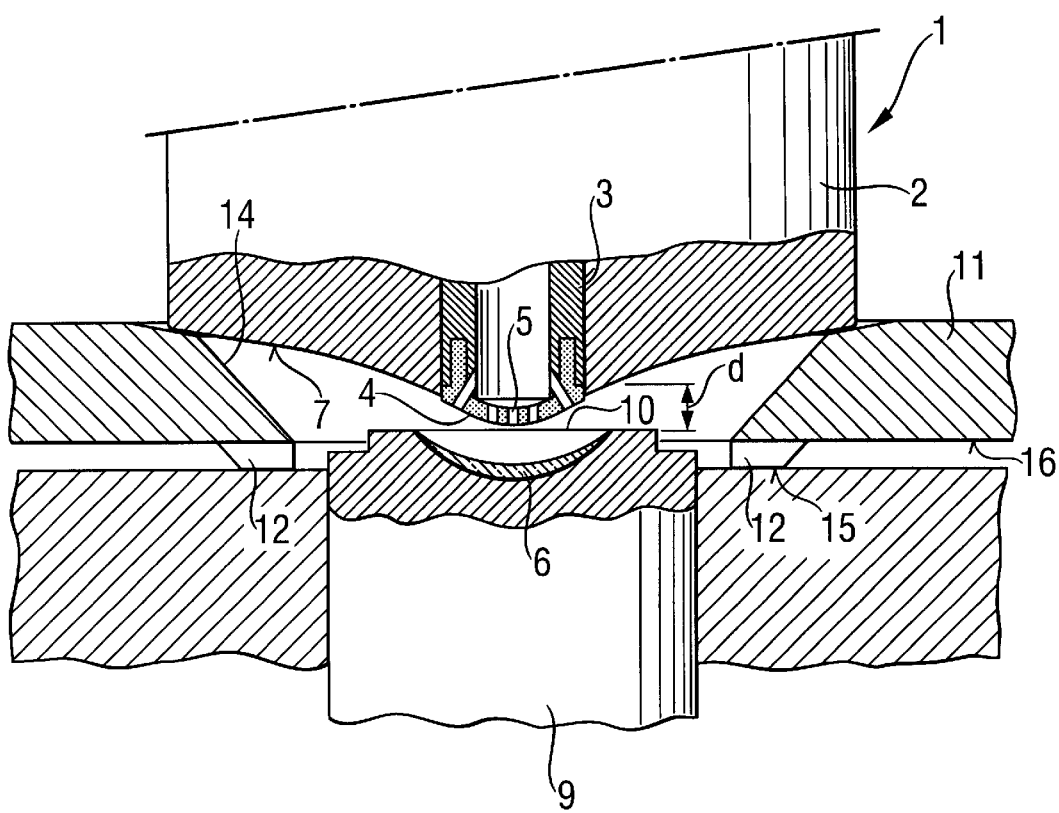
FIG. 2 shows a schematic illustration of an embodiment of a spacer according to the invention between a gripper and a mould half.

As is apparent from FIG. 2, the gripper 1 is positioned above a female mould half 9 in the gripping position. If a movable sleeve 2 is provided, by moving the gripping sleeve 2 upwards, it is ensured that the sleeve 2 does not touch the contour edge 10 of the mould half 9, which could lead to damage. The gripper 1 remains in this position first of all for approximately one second. During this time, the contact lens 6 should "float" in the female mould half 9, i.e. become correctly centred. On the other hand, vibration on the gripper 1 should die down. This ensures that the contact lens 6 is received by the gripper 1 in a central position. After this rest phase, the vacuum is applied. The gripper 1 stays in the gripping position for another one second, before it moves upwards again. During this time, all contact lenses 6 located in the female mould halves 9 of a tool should be safely transferred. After transfer of the lenses, the inner section 3 of the gripper moves back up to its starting position and the whole gripper 1 proceeds to the next workstation.

Figure 3:
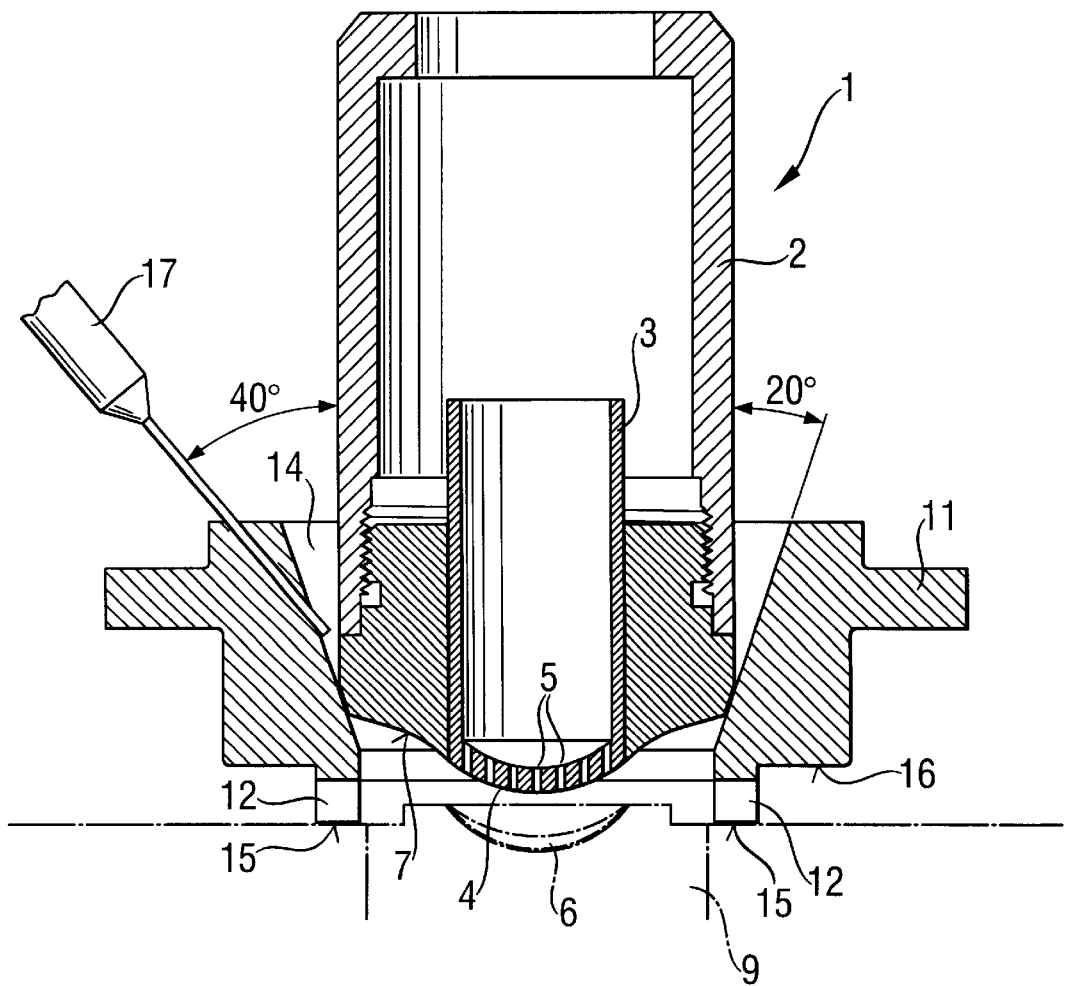
FIG. 3 shows a schematic illustration of a second embodiment of a spacer according to the invention between a gripper and a mould half.

In accordance with the invention, a spacer 11 is provided between the mould half 9 and the end region 4, 7 of the inner section 3 of the gripper. With this, the distance d between the mould half 9 and the gripper 1 is increased. The distance d between the gripper 1 and the mould half 9 is measured between the contour edge 10 of the mould half 9 and the end face 7 of the gripper 1. The spacer 11 is shaped so that it seals the inner section 3 of the gripper in the gripping position towards the exterior. A stop is preferably provided for this, defining the end position for suction of the contact lens. The gripper 1 is moved against it. The spacer 11 is advantageously a ring shape. In particular, there may be a provision for the inner area of the spacer 11 to be a conical shape, as illustrated in FIG. 3. When the gripper 1 is lowered into the gripping position, it rests on the cone cover to form a solid stop and thus a seal, without any precise alignment. The height tolerance of the gripper 1 lies in the range 200–300 μm. Especially when the gripping sleeve 2 is of a movable design, this tolerance can be easily balanced by shifting the outer sleeve 2. In contrast, there is no seat towards the mould half 9, so that when the vacuum is applied flux can develop. To enable a regular flow to take place in the direction of the end region 4 of the inner section 3 of the gripper, the spacer 11 is provided according to the invention with cut-outs 12. The spacer 11 may be formed in one piece or in many parts. The cut-outs 12 may be formed as bores, but slits or other geometric shapes are also possible. If pressure is applied by vacuum to the gripper 1, the effect of the vacuum increases through the spacer ring 11, since a defined amount of pressure is exerted on the contact lens. The end region 4 of the inner section 3 of the gripper pulls the contact lens 6 and the contact lens 6 then lies centrally around the end region 4 of the gripper 1. A distance d of 0.5 mm to 1.5 mm, preferably 1 mm, is provided between the contour edge 10 of the mould half 9 and the end region 4 of the gripper 1. This ensures that the gripper 1 no longer touches the mould half 9 and the contact lens 6 and damage is thus avoided.

Figure 4:
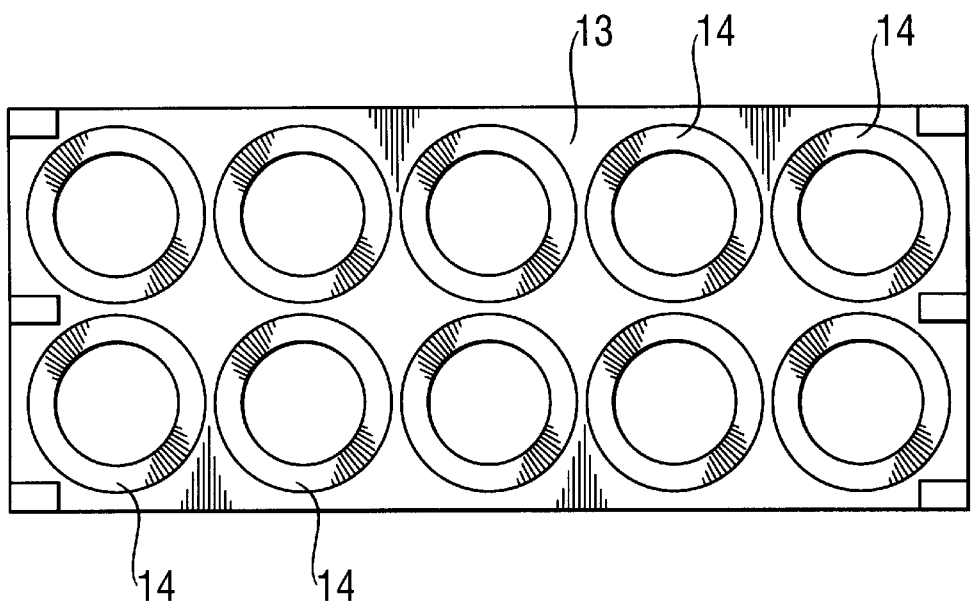
FIG. 4 shows a plan view of a plate with conical bores.

In particular when several mould halves 9 are grasped on a tool holder, is it advantageous for the spacer 11 to be formed as a plate 13 which is equipped with conical bores 14. This is illustrated schematically in FIG. 4, whereby the bores 14 then each form the inner region of a spacer 11. As is evident from FIG. 3, the end faces of the bores 14 may have studs 15. which serve as a buffer surface on the tool holder and at the same time give a certain distance. In this instance, the spaces between the studs represent the cut-outs 12 of the spacer 11. Because of these studs 15, the end face 16 of the plate 13 hovers 1 mm, corresponding to the height of the studs, above the mould halves 9, thereby minimising the danger of damage. After the plate 13 with the bores 14 has been placed on the tool holder, the gripper moves into the conical rings 14. When the gripper 1 is designed in particular with a rigid inner section 3 and a movable sleeve 2, high tolerances are cushioned by the sleeve 2 sliding back. As soon as the gripper 1 touches the cone cover, the gripper is in the gripping position. Air is drawn through the gap 12 between the studs 15 when the vacuum is applied, and the contact lens 6 is sucked up. After removing the lenses 6, the gripper 1 is raised again and the plate 13 is subsequently moved again into its starting position.

Figure 5:
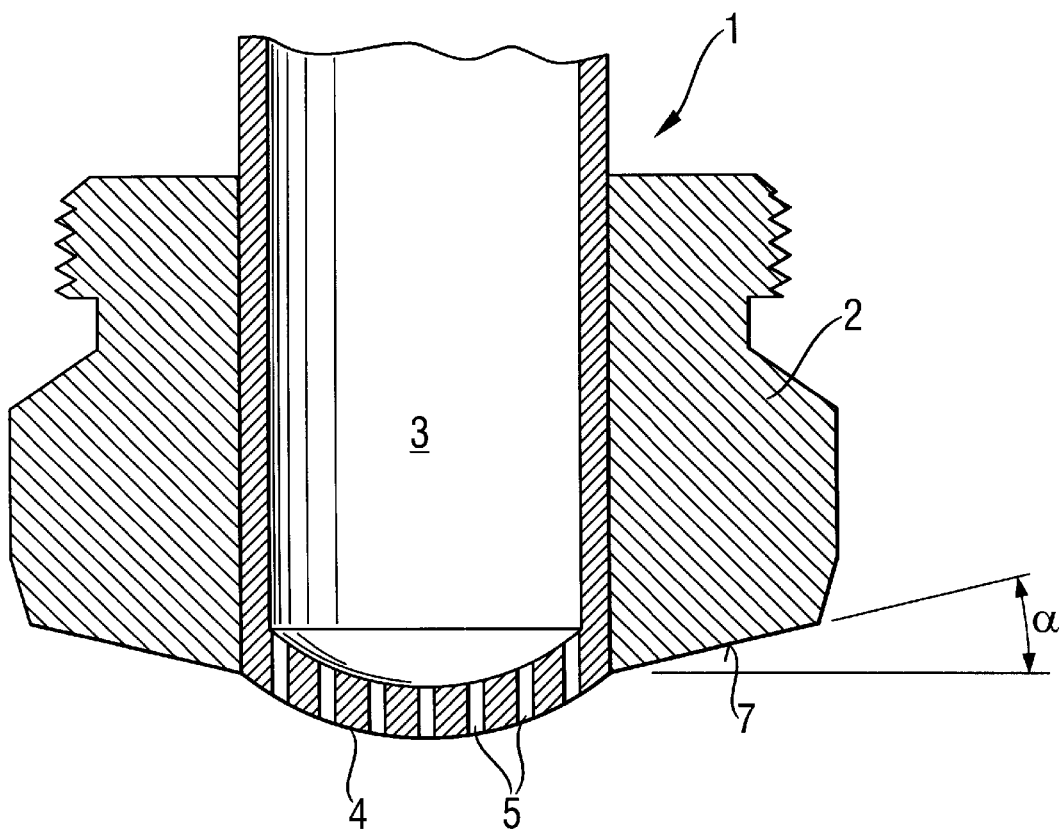
FIG. 5 shows a schematic illustration of a further embodiment of an end region of the gripper.

Because of the strong suction of the contact lens 6, it is stretched beyond the end region 4 of the inner section 3 of the gripper. This leads to possible flaws on the edge of the contact lens 6 being more reliably recognised by the subsequent automatic image processing system. As is evident from FIG. 5, this effect can be strengthened by a conical tapering of the end face 7 of the gripper 1, which diverges from a curved line. The inclination of the face 7 towards the horizontal is determined by the angle α.

Furthermore, a nozzle 17 may be integrated into the spacer 11 in order to moisten the contact lens prior to removal, thus facilitating removal of the contact lens.

Figure 6:
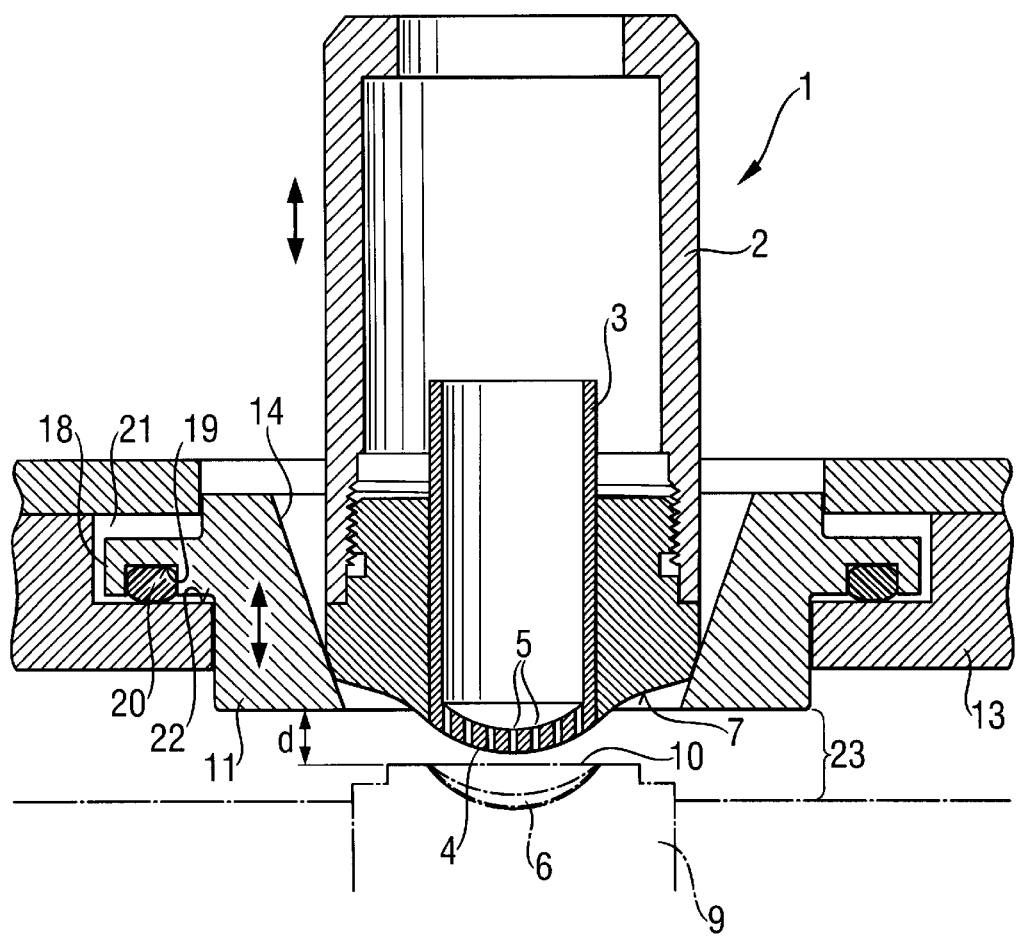
FIG. 6 shows a schematic illustration of a third embodiment of a spacer according to the invention between a gripper and a mould half.

A further embodiment of a spacer 11 is illustrated in FIG. 6. Again, the inner area of the spacer 11 is conical, but in the outer area it has an annular lug 18 with a slot 19 for receiving an elastic O-ring 20. The spacers 11 are in turn stored in a support plate 13, which is equipped with slots 21 to receive the lugs 18. The O-ring rests directly on the base 22 of the slot 21, thereby providing elastic support of the spacer 11. As the gripper 1 enters the spacer 11, it is possible to balance the manufacturing tolerances. In this embodiment, the plate 13 does not rest on the tool holder by means of studs, but is placed directly on stop faces not illustrated here, which are attached to the tool holder and are spaced from the contour edge of the mould half. In order to enable air to be supplied to the contact lens in this embodiment, the cut-outs 12 are formed as ring slots 23. This embodiment in particular enables a simpler assembly of the spacers 11 to take place in the plate 13, since manufacturing tolerances are balanced by the elastic support means.

In all, the invention offers the possibility of increasing the gap between the mould half and the gripper without decreasing the gripping strength. In this way, damage to the mould half or the contact lens is avoided, and alignment of the gripper to the mould half is simplified. Moreover, the invention enables flaws in the periphery of the contact lens to be noticed more easily, since owing to the greater flux acting on the contact lens, the latter undergoes greater expansion in the end region of the gripper, thereby enabling possible flaws to be discerned more easily. This can be further enhanced by a conical shape at the end face of the gripper. In addition, the contact lens is centred more accurately on the gripper, whereby image processing is likewise improved.

We claim:

1. Apparatus for removing a contact lens from a storage container or a mould half, comprising:

a gripper to which a vacuum may be applied, the gripper having an end region adapted to the shape of the contact lens and having at least one bore for sucking up the contact lens, a spacer arranged between the gripper and the storage container or the mould half, the spacer being formed as one piece or in many parts and having an airtight seal to the gripper, and the spacer further being equipped with at least one cut-out for sucking in air, wherein the spacer does not contact the mould half, and wherein the spacer is provided with a stop to also prevent the gripper from contacting the mould half, so that the contact lens can be sucked from the mould half without the mould half being contacted by the spacer or the gripper.

2. Apparatus for removing a contact lens according to claim 1, wherein the spacer has a ring-shaped inner region.

3. Apparatus for removing a contact lens according to claim 2, wherein the inner area of the ring is a conical shape forming a cone, the cone forming the stop.

4. Apparatus for removing a contact lens according to claim 3, wherein studs are provided on the side of the spacer facing the contact lens, the at least one cut-out representing a gap between the studs.

5. Apparatus for removing a contact lens according to claim 1, wherein a number of spacers are held on a plate.

6. Apparatus for removing a contact lens according to claim 5, wherein the spacers are elastically held in the plate by an O-ring.

7. Apparatus for removing a contact lens according to claim 6, wherein the at least one cut-out is formed as a ring slot.

8. Apparatus for removing a contact lens according to claim 1, wherein the end region of the gripper is convex, and wherein the convex end region of the gripper changes into a conical edge.

* * * * *